United States Patent [19]

Cordery et al.

[11] Patent Number: 4,778,018

[45] Date of Patent: Oct. 18, 1988

[54] APPARATUS AND METHOD OF DETERMINING THE MASS OF AN ARTICLE BY MEASURING THE SHIFT IN THE PERIOD OF HARMONIC MOTION

[75] Inventors: Robert A. Cordery, Danbury; William G. Hart; David W. Hubbard, both of Stamford; Morton Silverberg, Westport, all of Conn.

[73] Assignee: Pitney Bowes Inc., Stamford, Conn.

[21] Appl. No.: 73,790

[22] Filed: Jul. 13, 1987

[51] Int. Cl.[4] ........................ G01G 3/14; G01G 23/02; G01G 23/10

[52] U.S. Cl. .............................. 177/210 FP; 177/154; 177/185

[58] Field of Search ...................... 177/1, 210 FP, 154, 177/185

[56] References Cited

U.S. PATENT DOCUMENTS 3,555,886 1/1971 Thornton ...................... 177/210 FP
3,612,198 1/1971 Gallo .
3,926,271 12/1975 Patashnick .
4,050,530 9/1977 Storace .
4,158,395 6/1979 Brown .
4,185,709 1/1980 Irvine .
4,405,024 9/1983 Fraval et al. ............. 177/210 FP X
4,418,774 12/1983 Whitney et al. .............. 177/210 FP
4,429,574 2/1984 Barry et al. .............. 177/210 FP X
4,497,386 2/1985 Meier ............................. 177/154 X
4,623,030 11/1986 Portman, Jr. et al. ....... 177/210 FP

*Primary Examiner*—George H. Miller, Jr.
*Attorney, Agent, or Firm*—Peter Vrahotes; Melvin J. Scolnick; David E. Pitchenik

[57] ABSTRACT

Apparatus and method of determining the mass of an article by the shift of the period of oscillation of a flexibly mounted platform. An article whose mass is to be determined is placed upon the platform. The platform is caused to oscillate and the period of harmonic motion is calibrated. This period is compared against the period of harmonic motion when there is no article upon the platform, and the difference, or shift, in frequency, allows a determination of the mass of the article.

49 Claims, 7 Drawing Sheets

APPARATUS AND METHOD OF DETERMINING THE MASS OF AN ARTICLE BY MEASURING THE SHIFT IN THE PERIOD OF HARMONIC MOTION

BACKGROUND OF THE INVENTION

As technology progresses, processes tend to proceed at a faster pace. Most processes require the coordination of a number of components, and the process can only proceed as fast as the slowest component allows unless multiple like components are used. There are certain processes in which the weight of an article is required, but to date no scale has been available that provides accurate, fast weighing. By accrate is meant the ability to weigh an object having a weight of up to 64 ounces within 1/32 of an ounce. By fast is meant the ability to weigh a stream of conveyed articles within less than one second per article. A process where there is a need for fast weighing is in the processing of mail. High speed systems have been developed whereby the appropriate number of inserts, which number may vary from envelope to envelope, are placed within an envelope. The envelope is sealed and postage is printed on the envelope. Before the postage can be printed, however, it is necessary that the weight of the mail piece be determined. Heretofore, weighing devices for such mail processing systems have been developed, but these generally have been rather slow. Actually, many prior weighing devices combined a standard scale with a mechanism that would stop the mail to allow weighing to take place. In order to accommodate the output of an inserter, multiple scales would be used with alternate mail pieces diverted to such scales.

Although these prior weighing devices work rather well with prior mail processing systems, with high speed inserters of contemporary design, the one function that inhibits fast processing of mail is the weighing of mail pieces before postage is applied thereto. In order to overcome this problem, multiple scales would be used downstream from a high speed inserter and the mail pieces would be alternated to such scales. Obviously, use of multiple scales is expensive and requires additional conveying functions that could result in a greater number of jams.

Certain prior high speed weighing devices employed to weigh articles that are part of a train of articles, determined the weight of each article while the scale was still in motion. See for example U.S. Pat. No. 3,800,893. The drawback to such weighing systems is that of expense. Still another scheme of fast weighing is to weigh a large number of articles simultaneously and obtain the average weight, but this is useless when the individual weight of each piece is required.

SUMMARY OF THE INVENTION

A unique weighing device has been conceived utilizing the principles of harmonic vibration for the purposes of determining the weight of an article. A flexibly mounted platform is caused to oscillate by an initial excitation action. The frequency of the oscillation is primarily dependent upon the total mass of the platform, and anything connected thereto, and the platform spring constant. A calibration test is first conducted. The platform with its associated components is caused to oscillate by applying an exciting pulse and the periods of oscillation with different calibrated weights are measured. An object is then placed upon the scale and again the platform is excited. The period of oscillation of the platform with the article of unknown weight thereon is determined. The period of oscillation obtained with the article on the platform is compared with the calibration tests and the mass of the article thereafter can be determined using derived equations.

Figure 1:
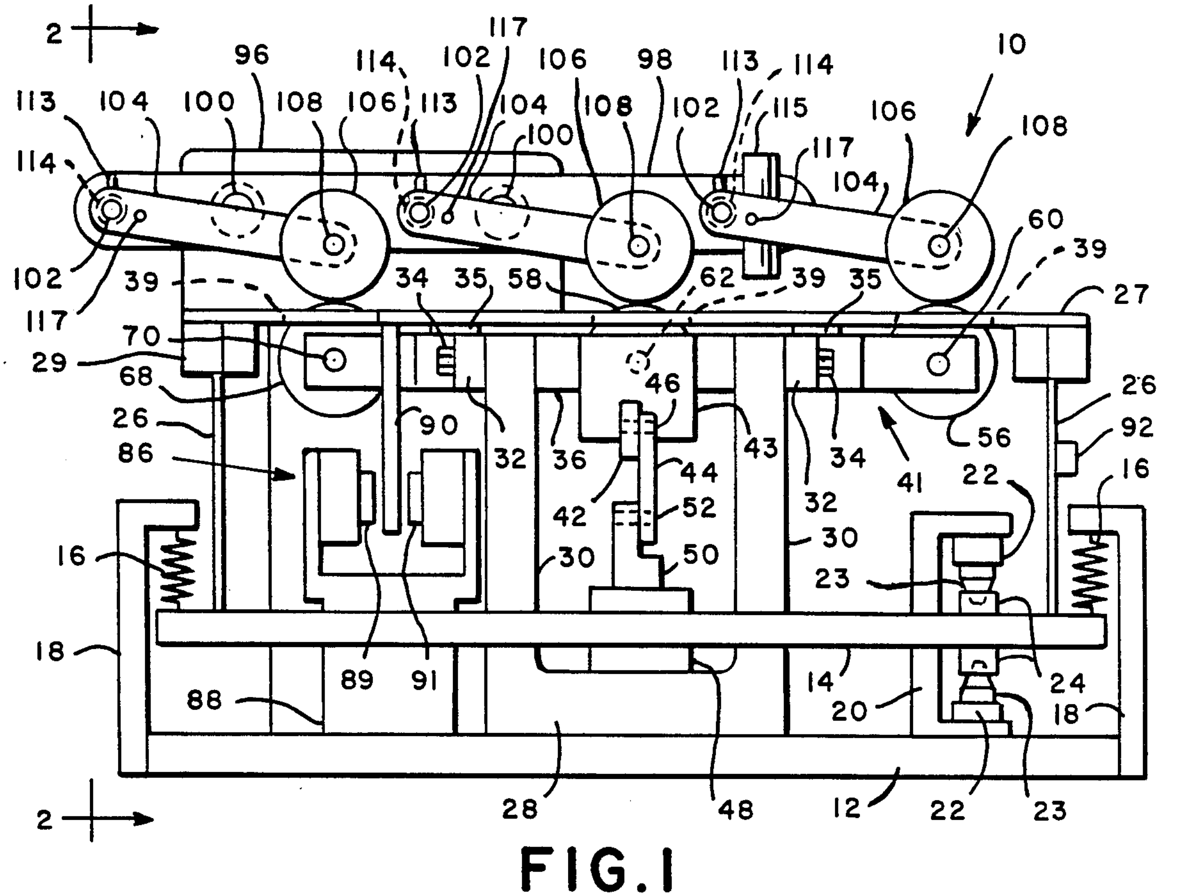
FIG. 1 is a longitudinal view of a weighing device that incorporates features of the instant invention.
Figure 2:
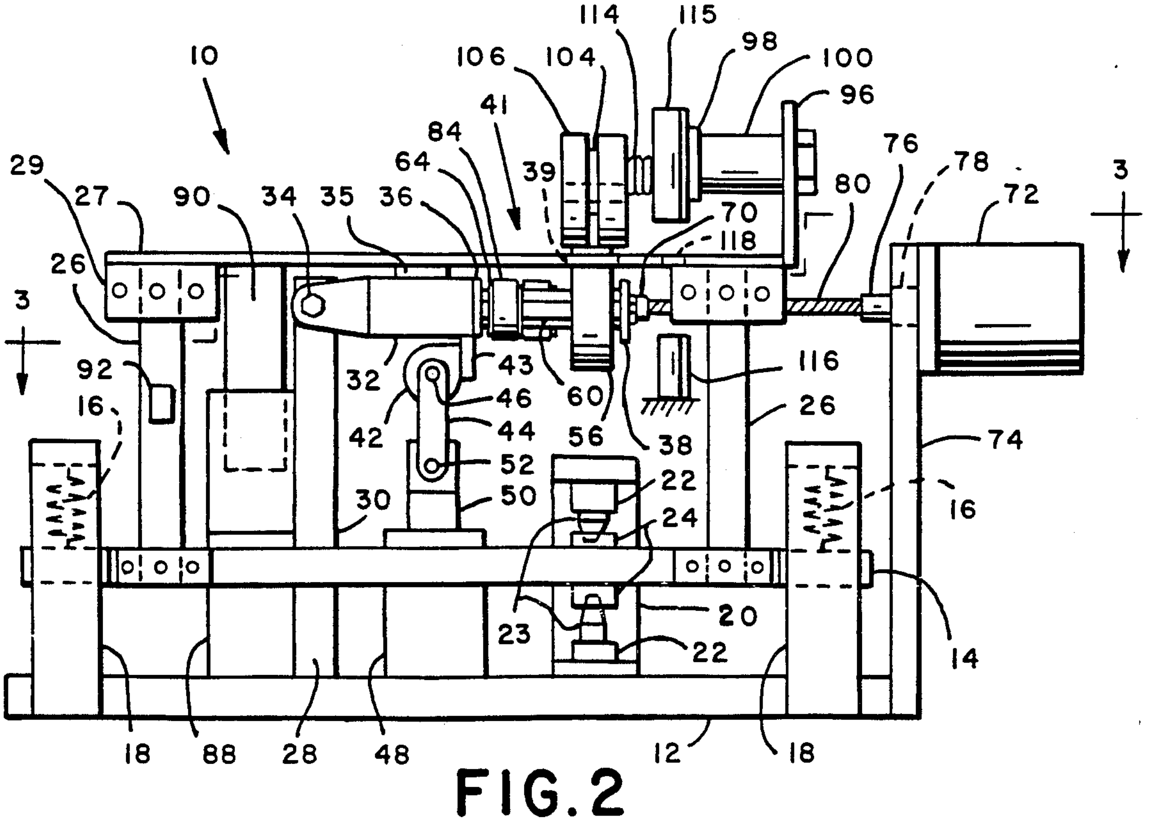
FIG. 2 is an end view of the weighing device taken along the lines 2—2 of FIG. 1.
Figure 3:
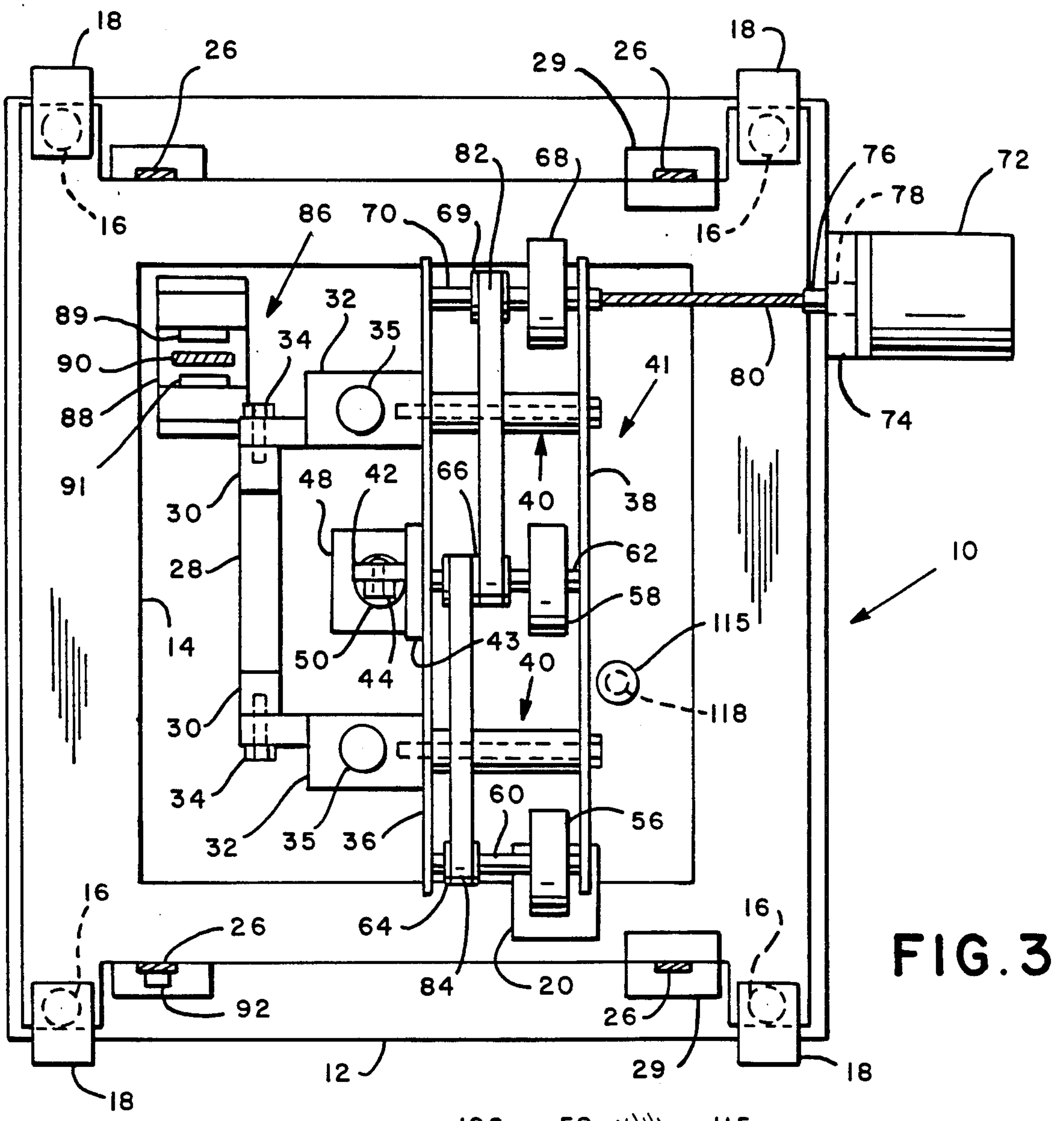
FIG. 3 is a plan view taken along the lines 3—3 of FIG. 2.
Figure 8:
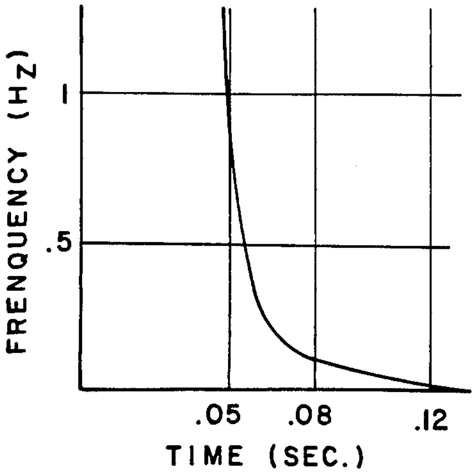
Figure 9:
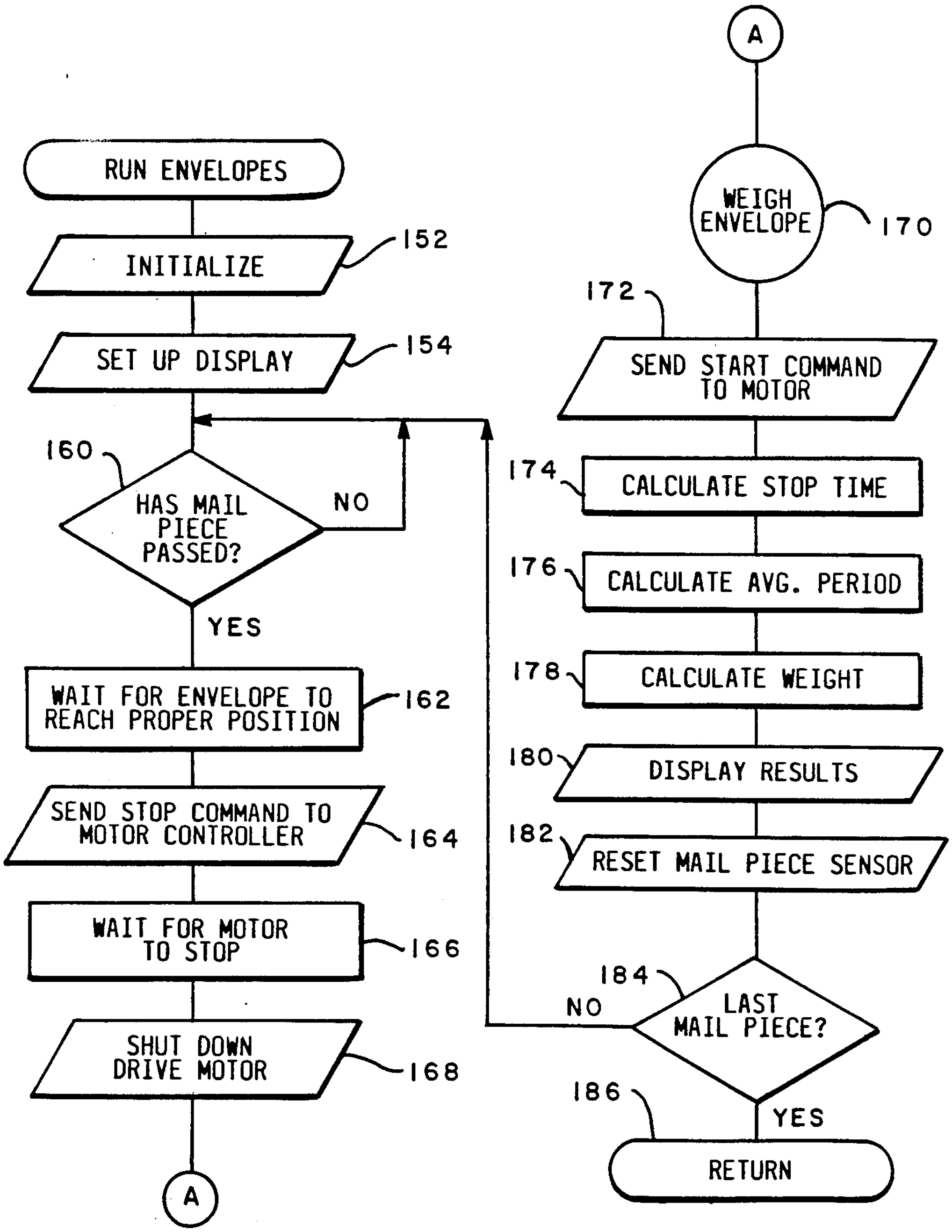
Figure 10:
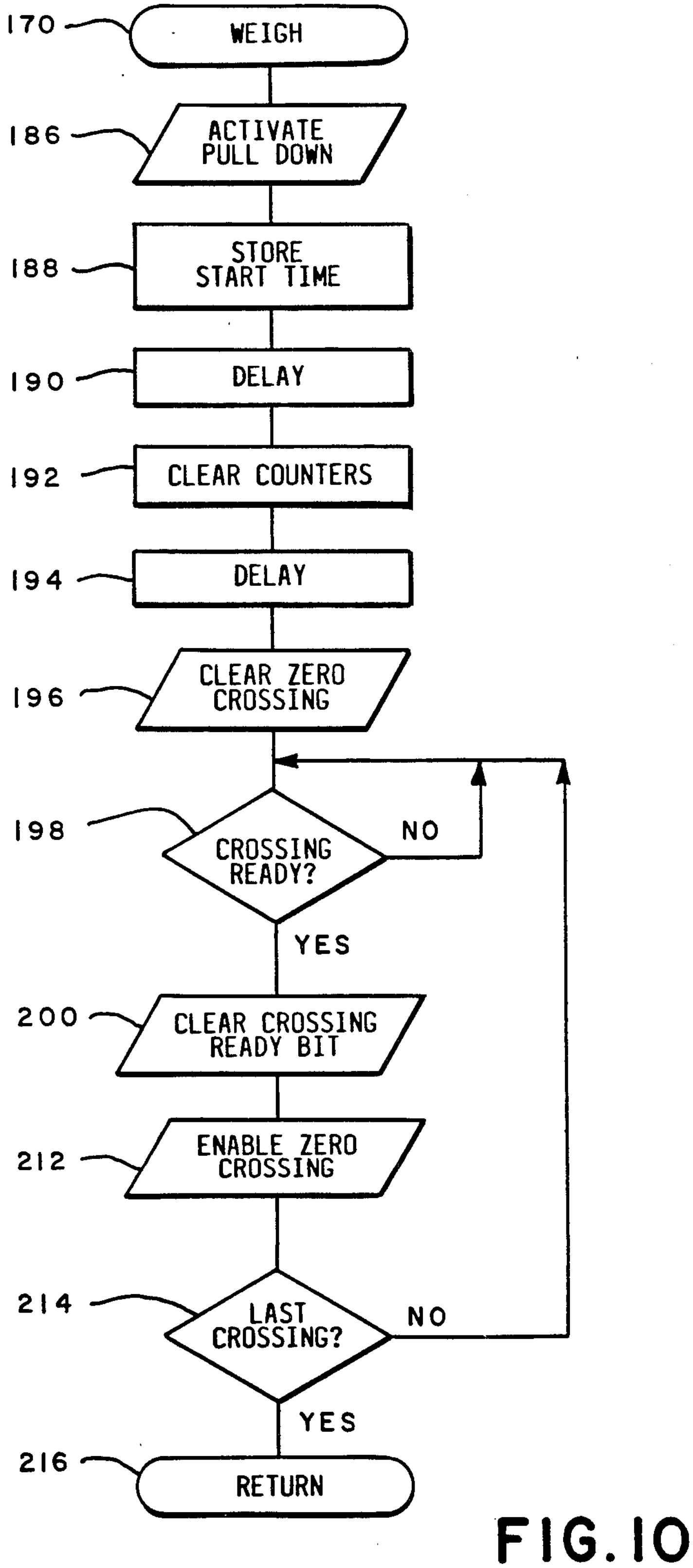

FIGS. *7a–7c* are graphs that show a single pulse applied to the weighing device, a plot of the oscillation of the platform of the weighing device shown in FIG. 1 as a result of the single pulse, and a square wave form of the oscillation, respectively;

FIG. 8 is a graph showing percent of error in the period as a function of time;

FIG. 9 is a flow chart describing the functioning of the weighing device shown in FIGS. 1-4; and FIG. 10 is a flow chart describing the steps involved in determining the mass of an article.

Appendix A is a program listing of the weight determining software.

DETAILED DESCRIPTION OF THE PREFERRED EMBODIMENT

Referring to FIGS. 1-4, a weighing device utilizing the features of the instant invention is shown generally at 10. Although the weighing device 10 may be used in a large number of applications wherein fast and accurate weight determination is required, it will be described as used in a system that processes mail pieces such as envelopes with inserts, post cards and the like to which postage is to be applied. It should be noted that the device of the instant invention measures mass as opposed to measuring weight, as will be hereinafter explained, but for purposes of convenience, the device is referred to as a weighing device. Referring specifically to FIGS. 1-4, the weighing device 10 includes a frame 12 that may be placed upon a machine housing, table or other type of support. A base 14 is supported above the frame 12 by isolating coil springs 16 each of which is secured at one end to an inverted, generally L-shaped vertically extending arms 18 of the frame 12 and to the base 14 at its other end. The isolation springs 16 serve the purpose of isolating the weighing device 10 from vibrations transmitted by the support upon which the base 12 is placed. For example, if the base is placed upon a mailing machine or inserter, such support member, when operating, has a tendency to transmit vibrations. The presence of the isolating springs 16 is to reduce the transission of vibrations. Preferably, the springs 16 have a high spring constant in the vertical direction and a low spring constant in the direction of oscillation, which oscillation will be described hereinafter.

Another, but smaller, vertical arm 20 is attached to the frame 12. This vertical arm 20 and the frame 12 support a pair of cage clamping solenoids 22 whose plungers 23 have a conical shape at their ends and are engageable with the depressions of generally cup shaped pads 24 secured to opposite sides of the base 14. Upon enablement, the plungers of solenoids 22 will be received within the depression of the pads 24 to securely hold the base 14 as will be described in greater detail hereinafter.

Secured to the base 14 are a plurality of flexible supports 26, upon which a platform 27 is secured by connectors 29. These flexible supports 26 are made of thin strips of stainless steel. Although four flexible supports are shown in the preferred embodiment, it will be appreciated any number may be used without departing from the scope of the invention.

A bracket 28 is secured to the frame 12 and has upright members 30 that support links 32 as by bolts 34. Secured to the top of each link 32 is a resilient button 35 that is preferably made from a soft, dampened rubber. A pair of plates 36,38 are connected to the links 32 and are spaced from one another by spacer-bolts combinations 40 to define a cage 41. Depending from the plate 36 and secured thereto by a flat 43 is a trunnion 42 to which a link 44 is rotatably attached by a pin 46. A solenoid 48 is secured to the frame 12, the piston 50 of the solenoid having a pin 52 that is pivotable received within one end of the link 44. With this construction, as the solenoid 48 is actuated, the links 32 will be rotated about the bolts 34 as a result of the link 44 acting upon the trunnion 42. Disposed between the plates 36,38 are two idler rollers 56,58, that are receivable within openings 39 of the platform 27 and are rotatably supported by shafts 60,62, respectively, secured to the plates 36,38 and forming part of the cage 41. One of the shafts 60 has a single pulley 64 mounted thereon, and the other of the shafts 62 has a double pulley 66 mounted thereon. A drive roller 68 and a drive pulley 69 are mounted on a drive shaft 70 that forms part of the cage 41. The drive shaft 70 is driven by a motor 72 that is secured to the frame 12 by a bracket 74. The output shaft 76 of the motor 72 extends through an opening 78 of the bracket 74. A flexible shaft 80 connects the motor output shaft 76 to the drive shaft 70 so that the cage 41 is able to move relative to the motor 72 while still providing drive between the motor and the drive shaft 70. A belt 82 is trained about the pulley 69 and one portion of the double pulley 66. Another belt 84 is trained about the other portion of the double pulley 66 and the idler pulley 64, to provide drive from the drive shaft 70 to the idler shafts 60,62. In this way, when the motor 72 is powered the rollers 56,58 and 68 will be driven.

An electromagnet 86 is supported by a bracket 88, that is mounted on the frame 12. An armature 90 depends from the platform 27 and is received between the poles 89,91 of the electromagnet 86. A transducer 92, as for example, a piezoelectric device, is secured to one of the flexible supports 26 and has a lead 93 extending therefrom to an electrical system 94 that will be described with reference to FIG. 5.

Secured to the platform 27 is a bracket 96 to which a plate 98 is attached by spacer-bolt combinations 100. A plurality of pins 102 are fixed to the plate 98 and each pin 102 rotatably supports a pivot arm 104. An idler roller 106 is rotatably supported upon each pivot arm 104 by a pin 108, these idler rollers having a width greater than the width of the platform openings 39.

Positioned on each pin 102 between the plate 98 and each pivot arm 104 is an expansion spring 114 that has tags 113,117 at its opposite ends that are received within the plate 98 and pivot arms, respectively. These springs 114 are provided to urge the idler rollers 106 toward the platform 27. Each idler roller 106 is in registration with one of the rollers 56,58,68. It should be noted that the width of each of the rollers 56,57,68 is less than the width of the openings 39 so that these rollers are receivable within such openings whereas the rollers 106 are not receivable within such openings because of their greater width.

Located above the platform 27 is a light 115 and located below the platform 27 and in registration with the light is a photosensor 116, there being an opening 118 in the platform for allowing light to pass therethrough. The photosensor 116 is connected to the electrical system 94 by a lead 120. A mail piece 122 (see FIG. 4) is shown on the platform 27 at a location with its leading edge immediately past the photosensor 116.

Figure 5:
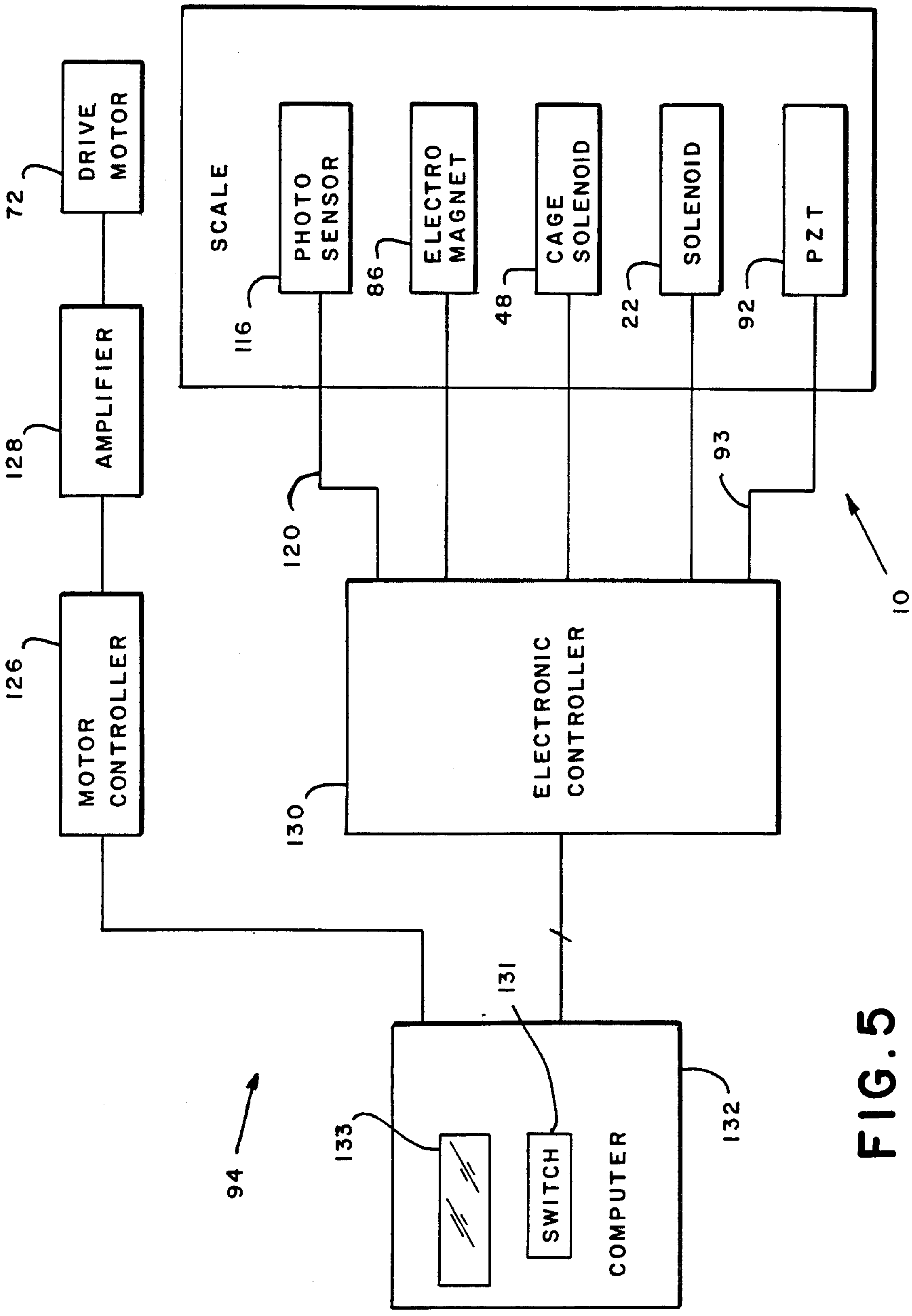
FIG. 5 is a diagram of the measuring circuit used by the weighing device shown in FIGS. 1-4.
Figure 6:
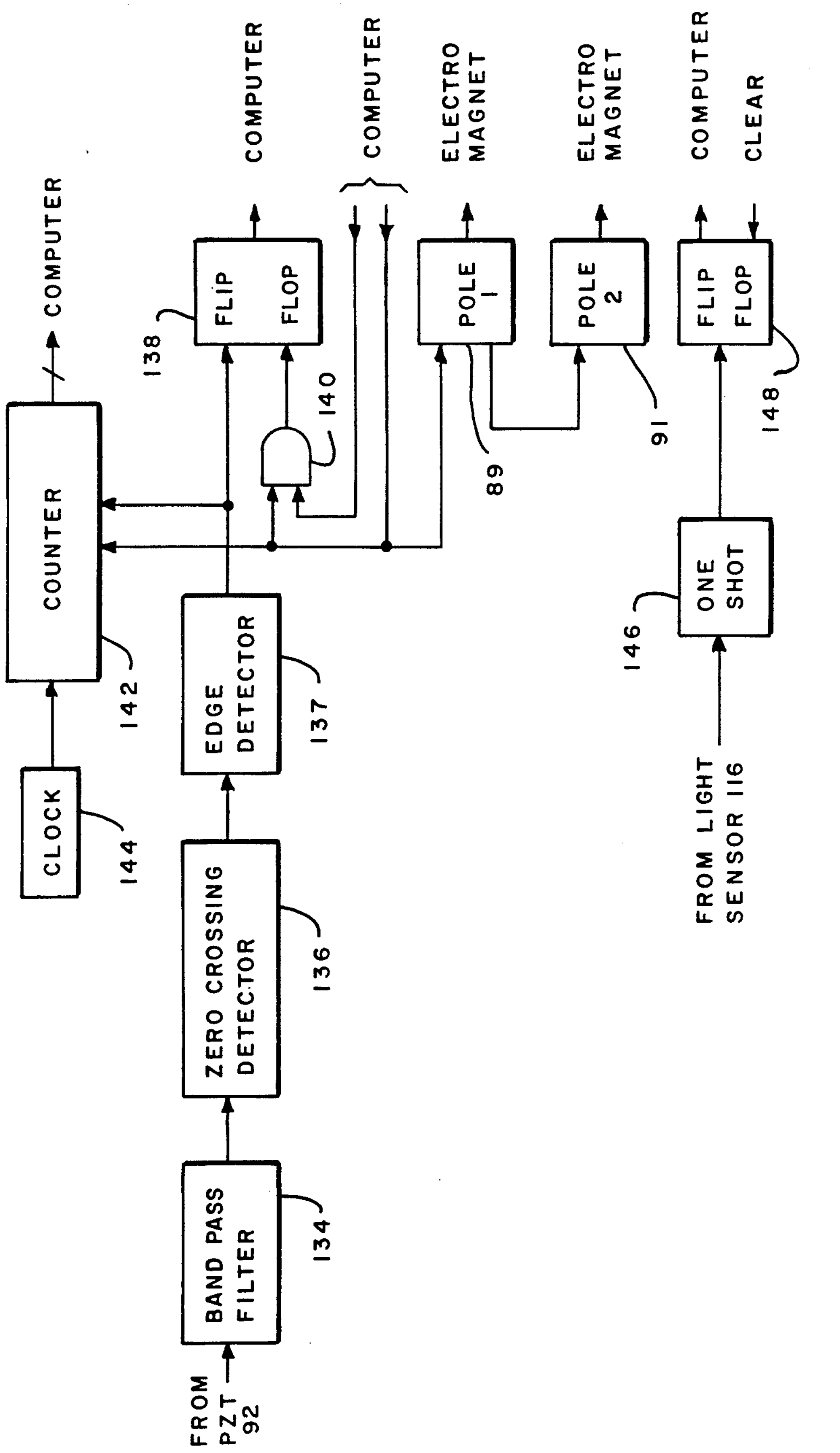
FIG. 6 is a block diagram of the components of the electronic controller shown in FIG. 5.

Referring now to FIGS. 5, the circuitry of the 10 electrical system 94 is shown along with components with which it communicates. This circuitry includes a motor controller 126 that is in electrical connection with an amplifier 128 that in turn is in electrical connection with the the drive motor 72. An electronic controller 130, the details of which are shown in FIG. 6, is in electrical connection with the photosensor 116, the electromagnet 86, the cage solenoid 48, the cage clamping solenoids 22, and the piezoelectric transducer 92. The electronic controller 130 is in electrical connection with a computer 132 which also is in connection with motor controller 126. The computer 132 has a switch 131 that enables the entire electrical system shown in FIG. 5 and a display 133 that displays a determined mail piece 122 weight. The components of the electronic controller 130 are shown in FIG. 6 and include a band pass filter 134 that receives the output from the piezoelectric transducer 92 and is connected to a zero crossing detector 136. The band pass filter 134 eliminates high frequency electrical noise and low frequency mechanical noise from the signal received from the piezoelectric transducer 92. In electrical connection with the band pass filter 134 is the zero crossing detector 136 which converts the signal received from the band pass filter to a square wave. The zero crossing detector 136 is in electrical connection with an edge detector 137 that detects the edge of each square wave produced by the zero crossing detector. The edge detector 137 is in electrical connection with a flip-flop 138 that receives an input from a AND gate 140. The AND gate 140 is in connection with the computer 132 and a counter 142 that has inputs from a clock 144 and the edge detector 137. The two poles 89,91 of the electromagnet 86 are in electrical connection with the counter 142. A one shot vibrator 146 is in connection with a flip-flop 148 and with the photosensor 116. The flip-flop 148 is in communication with the computer 132. Thus, as a mail piece is sensed by the photosensor 116, the one shot 146 will send a pulse to the flip-flop 148 which in turn will communicate to the computer 132 the presence of a mail piece. Alternatively, after a mail piece 122 is conveyed away from the photosensor 116, the one shot 146 will again pulse the flip-flop 148 to signal the computer 132.

Figure 4:
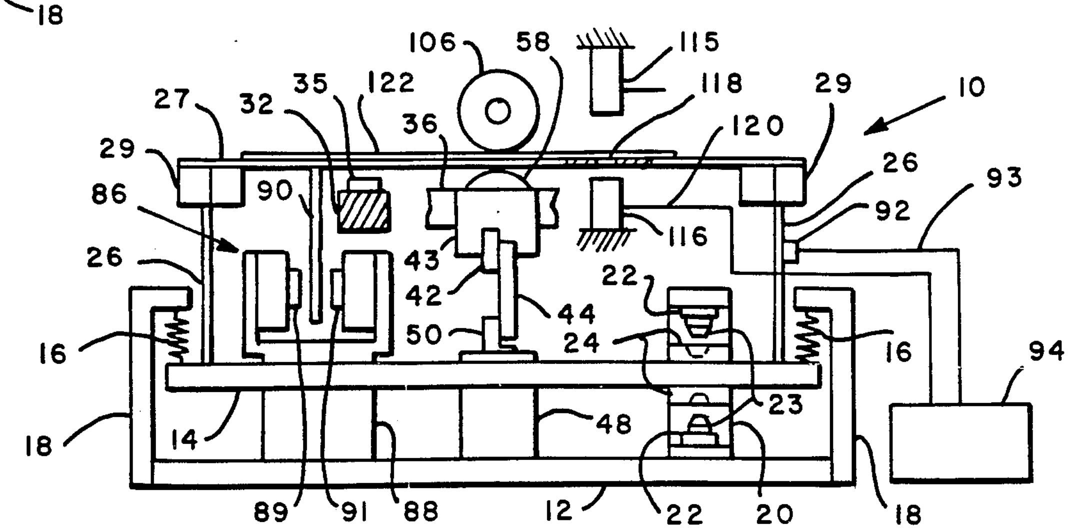
FIG. 4 is a side longitudinal view in section showing only selected parts of the weighing device shown in FIG. 1.

In operation, with the scale 10 in the rest position, the plunger 50 of the solenoid 48 is in its most extended position so that the cage 41 is at its highest location. Being in this location, the rollers 56,58,68 are received within the openings 39 of the platform 27 and engage the rollers 106. In this rest position, the buttons 35 are in contact with the platform 27 to hold the platform secure and the plungers 23 are received within the depression of the pads 24 to hold the base 14 secure. In this way, the cage 41 is locked so that there can be no movement of the various parts. When the scale 10 is to be operated, the on/off switch 131 of the computer is placed into the on position and the motor 72 is driven. This will result in the drive roller 68 being rotated and the other rollers 56,58 being rotated through the action of the belts 82,84. With the rotation of the lower rollers 56,58,68, the idler rollers 106 in contact there with will also be rotated. A mail piece 122 is placed into the nip of the rollers 68,106 by any convenient device such as the conveying mechanism of an inserter. The mail piece 122 will then be conveyed across the platform 27 until it travels passed the light 115 and photosensor 116. As the leading edge of the mail piece is sensed by the photosensor 116, a signal is sent to the electronic controller 130 thereby actuating the solenoid 48. With such actuation of the solenoid 48, the cage 41 will be pulled down as a result of the link 44 acting upon the trunnion 42 which is connected to the plate 36 and the rollers 56,58,68 will be removed from the openings 39 of the platform 27. As this occurs the springs 114 will urge the rollers 106 toward the platform 27 to securely retain the mail piece 122 thereon so that the combination of the platform and mail piece will move as a solid body. Simultaneously, the solenoids 22 will be activated so that the plungers 23 become disengaged from the pads 24 as can be seen in FIG. 4. In this state, both the platform 27 and the base 14 are in a state of free movement, the platform 27 being in such state because of the flexible supports 26 and the base because of the presence of the springs 16. Consequently, the base 14 and everything attached thereto is isolated from its surroundings. At this time, the electromagnet 86 is actuated by charges of opposite polarity being sent to the poles 89,91 and a pulse is produced as shown in FIG. *7a*. This pulse will cause attraction of the armature 90 towards one of the poles and repulsion from the other. The pulse will initiate free oscillation of the platform 27 because of the flexibility of the flexible supports 26. As the platform 26 oscillates, an approximate sinusoidal signal is transmitted from the transducer 92 in the form shown in FIG. *7b*. This sinusoidal signal is transmitted from the piezoelectric device 92 to the electronic controller 130 which is received by the zero crossing detector 136. The zero crossing detector acts as a Schmidt trigger and will convert the sinusoidal curve to a square wave pulse as shown in FIG. *7c*. The edge detector 137 will detect the edges of the wave, which represent the zero crossings of the sinusoidal curve of FIG. *7b* and send these edge detection pulses to the flip-flop 138. The flip-flop 138 will send these signals on to the computer 132 that will then determine the frequency of the zero crossings. This frequency will then be used to determine the mass of the mail piece 122 located upon the platform 27.

With the platform 27 having no mail piece 122 thereon, the electromagnet 86 is pulse energized for approximately 12 milliseconds, as is shown in the upper graph of FIG. *7a*, thereby causing the armature 90 to be attracted to one pole of the electromagnet 86 during the 12 milliseconds the electromagnet is pulse energized. The flexible members 26 and the platform 27 which is attached to them are thus excited into oscillation. The platform 27 will oscillate in the same horizontal direction as the mail pieces 122 are conveyed, i.e., in the plane of the platform, left and right as seen in FIG. 1. This is preferable otherwise the mail pieces 122 may tend to bounce. As the flexible support 26 with the transducer 92 thereon is flexed and continues to oscillate, the transducer will output an alternating voltage that will have a frequency depending upon the mass of the platform 27 and anything secured thereto. It will be noted that the platform 27 has the idle rollers 106 and the mechanisms for supporting the idler rollers attached thereto and is part of the mass that influences the frequency. As the platform 27 oscillates, its oscillation is measured by the transducer 92 as an output voltage as shown in FIG. *7b*. When the electromagnet 86 is first enabled, the sinusoidal curve is not symmetric and at least one cycle is required before a uniform curve is obtained. The error in the measurement of the frequency relative to time is shown in FIG. 8. Consequently, a delay is required before measurements can be taken, this delay being programmed into the computer 132 and being approximately 0.024 secs. After the delay, the frequency, or period, of zero crossings is determined by the electronic controller 130. After the frequency of zero crossings is determined, an article such as an envelope or mail piece 122 is placed upon the platform 27. This is accomplished by first supplying power to the motor controller 126 and other components by closing the switch 131. Thereafter a mail piece 122 is placed upon the platform 27 by any standard mail piece conveying means until it is received within the nip of the drive roller 68, and its associated idler roller 106. The mail piece 122 will then be driven onto the platform 27 by the rollers 56,58,68,106 and will be sensed by the photosensor 116. Upon the mail piece 122 being sensed, the drive motor 72 will be disabled and the cage solenoid 48 will be enabled. Upon the solenoid 48 being enabled, the plunger 50 will act upon the link 44 to pull down the cage 41. This is achievable because of the presence of the flexible output shaft 80. As the cage is pulled away from the platform 27, the rollers 56,58,68 become disengaged from the mail piece 122 that is located upon the platform 27. In this state the platform 27 will have a new mass, which includes the mass of the mail piece 122. It will be appreciated that the mail piece 122 will be held securely upon the platform 27 because the rollers 106 will still be in engagement therewith as a result of the biasing action of the springs 114 so the mail piece and platform will move as a unit. It will be recalled that the idler rollers 106 are wider than the openings 39 and thus will make contact with the platform 27 to hold the mail piece 122 firmly.

With the mail piece 122 on the platform in its predetermined position, i.e., under the rollers 106, the electromagnet 86 will once more be enabled causing the armature 90 and the platform 27 to oscillate in the same horizontal plane and direction as the mail piece 122 is transported. This oscillation will be sensed by the transducer 92 and the period of oscillation will be measured as described previously. From this, one will be able to determine the mass of the mail piece 122 located upon the platform 27 in accordance with the formula:

$$M_E = C_1(T^2 - T_0^2) + C_2(T^2 - T_0^2)^2, \quad (1)$$

where $M_E$ is the mail piece 122 mass, $T_0$ is the period of oscillation with no mail piece and T is the period with the mail piece present upon the platform 122. $T_0$, $C_1$ and $C_2$ are constants which depend on the mass of the base M and the mass of the platform 27 as well as on the spring constants of the isolation springs 16 and the flexible supports 26. These constants are determined empirically in a calibration procedure in which the periods are determined for at least two different masses as well as for the empty scale. In the limit that the base 14 is substantially heavier than the mass of the platform 27 plus the mass of the mail pieces, the constant $C_1$ is given by the formula:

$$C_1 \simeq K/(4\pi^2), \quad (2)$$

where K is the spring constant of the flexible supports 26. In the same limit $T_0$ is given by the formula:

$$T_0 2 \simeq (4\pi^2)\, M_p/K, \quad (3)$$

where $M_p$ is the platform 27 mass.

When a spring is attached to two isolated masses m and M, its period of oscillation is $$T^2 = 4\pi^2 \mu / K. \quad (4).$$

where $\mu$ is the reduced mass:

$$\mu = m\, M/(m+M). \quad (5)$$

In the limit where M is much larger than m, the reduced mass is less than and close to the value of m. Equation (4) can be solved for m in terms of T. In the scale 10, the base 14 mass M is much larger than m the combined platform 27 plus mail piece 122 mass; however, due to the accuracy required, the difference between $\mu$ and m must be taken into account. This is done by combining equations 4 and 5.

There are other corrections to the period due to the fact that the system is damped slightly and due to the fact that the base 14 is attached to the frame 12 through the isolation springs 16. The system is further complicated by the fact that the attempt to determine the period is done through measurements of the first few periods of oscillation. During this time, some initial transients due to the initial pulse are occurring. As a result, the best that can be said is that it can be expected that the mass is a nonlinear function of the period squared with the leading nonlinearity given by equations 4 and 5. It has been observed empirically that the nonlinearity can be approximated by a parabola represented by equation 1.

Figure 7A:
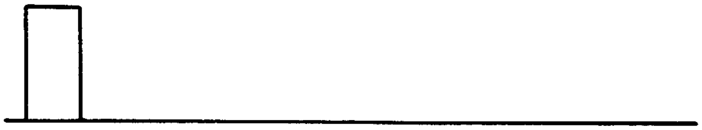
Figure 7B:
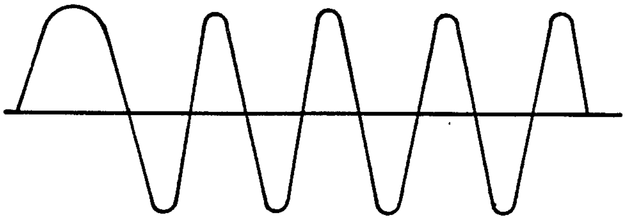
Figure 7C:
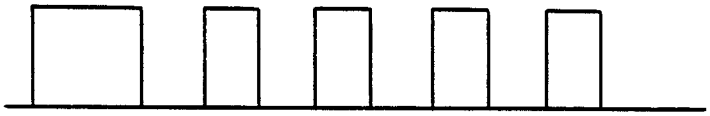

The mass is determined by the circuitry shown in FIGS. 5 and 6. The computer 132, which may be any of a number of standard commercially available computers such as a Compaq Model 286 PC, is in communication with the electronic controller 130. The transducer 92 will output a voltage that is filtered by the band pass filter 134 and applied to the zero crossing detector 136 which is basically an operational amplifier that saturates at five volts to output a square wave as shown in FIG. 7c. The duration of the square wave yields the time between zero crossings which is determined by the edge detector 137. The edge detector 137 outputs a pulse when each edge of the square waves is detected, which of course, represents zero crossing. These outputs are sent to the counter 142 that counts the clock cycles between zero crossings and sends such signals to the AND gate. The flip-flop will then send zero crossing signals to the computer 132. Based upon this count, the computer 132 will then compute the mass of the mail piece 122 through an algorithm that allows computation by application of the above formulas. This completed mass is then shown on the display 133.

After the output from the transducer 92 has been obtained, the solenoid 48 is enabled to lift the cage 41 so as to place the rollers 56,58,68 into the openings 39 and the buttons 35 will contact the platform 27. Simultaneously, the solenoids 22 are enabled to securely hold the base 14 in a predetermined position when the mail pieces are transported onto and off the platform 27. The motor 72 is powered and the mail piece 122 is ejected from the platform 27 to be received by any standard transport device.

The cage 41 locking by the buttons 35 and solenoids 22 serves two functions, the first of which has been described, i.e., placing the platform 27 in a predetermined position. The second function has to do with eliminating excitations from prior weighing. By holding fast the base 10 and platform 27, prior to weighing, the effects of prior activities are eradicated.

Using the method described above, one is able to obtain quite accurate determinations of the mass of articles placed upon the platform 27. The accuracy is better than 1/32 of an ounce for mail pieces 122 up to 64 ounces. Not only does one obtain an extremely accurate measurement of the mass, but it can be done in a rapid fashion. It has been found that a single mail piece 122 in a stream of mail pieces can be transported onto the platform 27, stopped, weighed and ejected in about 325 milliseconds. Overlapping entry of the next mail piece 122 simultaneously with ejection of the preceding one provides for weighing at the rate of 184 mail pieces per minute. This represents a significant advance in the weighing of articles in terms of cost, performance and simplicity of electronics over prior weighing devices.

The signal transmitted by the transducer is a relatively clean signal, i.e., free of mechanical noise that is introduced by vibrations. By way of example, in comparing the mechanical noise in this signal to that of a load cell scale, the mechanical noise in the weighing device 10 of the instant invention is much less. Because the platform 27 is acted upon to oscillate in a horizontal direction, the amount of acceleration, or "g's", can be three or four times greater than gravity "g". Because purity of the output signal is a function of the ratios of the g's to the mechanical noise, a better signal is received with higher g's. In load cell scales, the signals from the load cell are integrated of necessity and by providing sufficient time, the transducer signal can be determined. Because the instant device 10 has high g's, integration is not required. Furthermore, with the instant device 10, the signal being monitored is in a predetermined frequency range so that mechanical noises outside the predetermined frequency range can be filtered. A load cell scale uses a D.C. system whereas the instant device use an FM system thereby allowing monitoring in a predetermined frequency range.

Throughout the description of the preferred embodiment, it will be noted the mass is determined as opposed to weight. The weighing device 10 is not influenced either by gravity nor is it sensitive to tilt leveling. Because the platform is oscillated in a horizontal direction, gravity is not a factor in the measurements obtained and thus mass is determined. This is advantageous since the force of gravity varies from location to location.

Referring now to FIG. 9, a flow chart is shown that describes the functioning of the transport system of the weighing device 10. The mail pieces 122 are transported onto the platform 27 by any standard conveying mechanism and the electronic system in initialized 152. The display 133 is then enabled 154. The photocell 116 is monitored and a signal is generated 160 when a mail piece 122 is sensed. A delay 162 is provided to allow the mail piece 122 to reach its predetermined position. A stop command 164 is sent to the motor controller 126 to disable the motor 72. A delay 166 is provided to allow the motor 72 to stop and a shut down motor drive 168 signal is supplied. The mail piece 122 is then weighed 170 which will be described with reference to FIG. 10. Upon the obtaining of the mail piece 122 mass, a start command 172 is communicated to the motor 72. The stop time is calculated 174 and the average period of oscillation is calculated 176. The weight is then calculated 178 and the results displayed 180 on the display 133 and the mail piece sensor is reset 182. An inquiry is made if the last mail piece 122 has been processed 184 and if so the system is disabled 186.

Referring now to FIG. 10 the steps in obtaining the mass of a mail piece 122 will be described. The solenoid 48 is activated 186 to pull down the cage 41. The start time is stored 188 and a delay is provided 190 to give the rollers 56,58,68 time to leave the openings 39. The electromagnet 86 is energized 192 and another delay is provided 194 to make sure the coils 89,91 of the electromagnet have been activated. The zero crossing ready bit is cleared 196 and an inquiry is made whether the zero crossing detector 136 is ready. If so, the zero crossing ready bit is cleared 200. The zero crossing check is enabled 212 and then a determination is made if the last zero crossing has taken place 214.

APPENDIX - PROGRAM LISTING

© 1987 Pitney Bowes Inc.

```
\  DIGITAL IO CHANNELS
\
\       Port 1      Channel 0-7      Low order weight byte
\       Port 2      Channel 8-15     Middle order byte
\       Port 3      Channel 16 - 19  High order BITS
\                   21               Envelope ready
\                   22               Zero Crossing Ready
\
\       Port 4      Channel 25       Clear envelope ready
\                   Channel 26       Clear Zero Crossing ready
\                   Channel 27       Kick and Init
\                   Cahnnel 29       Pulldown
\
\
\  Subroutines
\
\       NAME                                PURPOSE
\ ------------------------------------------------------------------------------
\  STARTMOT                 Start COMPUMOTOR

\  STOPMOT                  Stop COMPUMOTOR

\  SHUTDOWN                 Cuts Power to COMPUMOTOR

\  DISPSTAT                 Displays motor status on first line
\                           of COMPUMOTOR DISPLAY

\  LCD1                     COMPUMOTOR outputs first line of
\                           display  to RS232 bus

\  ERROR?                   Checks for errors is PCI46s calls

\  CONFIG.PORTS             Configures Digital IO ports

\  NUMINPUT                 Inputs a number, and checks to see if it
\                           is a number

\  DIS.RESULTS              Displays weight bargraph, envelope weight
\                           and stop time

\  CALC.PERIODS2            Fills array TIMES with periods of
\                           zero crossings

\  CALC.POSTAGE             Sorts array TIMES takes middle 1/2 and
\                           takes geometrical average

\  CALC.PERIOD              (Tn - Tm)*2/(n-m)    n is last crossing
\                                                m is first crossing no.

\  MENU                     Menu for testing parameters

\  MAIN.DISPLAY             Sets up fancy display
```

```
\     ?ENVELOPE                   Waits for trigger from light sensor

\     WHEELS.UP                   Raises drive wheels

\     WHEELS.DOWN                 Lowers drive wheels

\     KICK                        Clears all counters, and sends out kick
\                                 impulse

\     WEIGH                       Weighs envelopes and measures stop time
\     Calibrate                   3 point calibration

\     RUN.ENVL                    Runs the scale

\     DEMO                        Main menu for the demonstration program


\

\   DECLARATION SECTION

    INTEGER SCALAR ERROR.CODE                  \ PCI46S Error code
    INTEGER SCALAR SEGMT                       \ Base address for PCI46S
    INTEGER SCALAR CHN                         \ IO Channel no
    INTEGER SCALAR INITV                       \ Initial values for port 4
    INTEGER SCALAR OUTVAL                      \ Output value
    INTEGER SCALAR INVAL                       \ Input value
    INTEGER SCALAR LBYTE                       \ Low order byte (crossing time)
    INTEGER SCALAR MBYTE                       \ Middle byte
    INTEGER SCALAR HBYTE                       \ High order byte
    INTEGER SCALAR NO.CROSS                    \ Number of crossings to measure
    INTEGER SCALAR NUMENVLS                    \ Number of envelopes to read
    INTEGER SCALAR PULLDOWN.DELAY              \ Time to wate for wheels to drop
    INTEGER SCALAR Y1
    INTEGER SCALAR NO.RANGES
    INTEGER SCALAR LOW.CROSS                   \ Crossing to start averaging
    INTEGER SCALAR CROSS.RANGE                 \ Number of crossings to average
    INTEGER SCALAR KOUNT
    INTEGER SCALAR EJECT.DELAY                 \ Time to wait to start looking
    INTEGER SCALAR ENVEL.DELAY                 \ Time to wait for Envl to stop
    INTEGER SCALAR STOP.DELAY

    REAL SCALAR POSTAGE                        \ POSTAGE DUE

    DP.REAL SCALAR WTIME                       \ Stop time
    DP.REAL SCALAR ZTIME                       \ Average crossing time
    DP.REAL SCALAR ZTIME.TOTAL                 \ time of last crossing
    DP.REAL SCALAR MINTIME                     \ Minimum average value
    DP.REAL SCALAR MAXTIME                     \ Maximum average value
    DP.REAL SCALAR C1                          \ Calibration value 1
    DP.REAL SCALAR C2                          \ Calibration value 0
    DP.REAL SCALAR T0                          \ Period of terr
    DP.REAL SCALAR T1                          \ Time for c1
    DP.REAL SCALAR T2                          \ Time for c2
    DP.REAL SCALAR MASS                        \ Calculated mass
    DP.REAL SCALAR M1                          \ Calibration mass 1
    DP.REAL SCALAR M2                          \ Calibration mass 2
    DP.INTEGER DIM[ 50 ] ARRAY CROSS           \ holds actual crossings
    DP.REAL DIM[ 50 ] ARRAY TIMES              \ holds periods
    DP.REAL DIM[ 50 ] ARRAY SCALE              \ Scaling array
    REAL DIM[ 50 , 2 ] ARRAY PVALUE
    REAL DIM[ 2500 ] ARRAY VUPORT.ARRAY        \ Vuport for bargraph

    DIM[ 1 , 41 ] STRING.ARRAY INDATA          \ input array for lcd1
    : RS232.PORT

    COM1                                       \ Set communication port 1

    INDATA "RS232.BUFFER                       \ Set up input buffer
```

```
EOS.OFF
DSR.OFF
;
: STARTMOT                              \ send commands to start
    ASCII S RS232.OUT                   \ motor over the rs232 bus
    ASCII T RS232.OUT
    ASCII A RS232.OUT
    ASCII R RS232.OUT
    ASCII T RS232.OUT
    ASCII ; RS232.OUT
;
: STOPMOT                               \ send command to stop
    ASCII S RS232.OUT                   \ motor over rs232 bus
    ASCII T RS232.OUT
    ASCII O RS232.OUT
    ASCII P RS232.OUT
    ASCII ; RS232.OUT
;
: SHUTDOWN
    ASCII R RS232.OUT
    ASCII U RS232.OUT
    ASCII N RS232.OUT
    32  RS232.OUT
    ASCII F RS232.OUT
    ASCII R RS232.OUT
    ASCII O RS232.OUT
    ASCII M RS232.OUT
    32 RS232.OUT
    ASCII 5 RS232.OUT
    ASCII 0 RS232.OUT
    ASCII 0 RS232.OUT
    ASCII ; RS232.OUT
;
:   DISPSTAT
    ASCII D RS232.OUT
    ASCII I RS232.OUT
    ASCII S RS232.OUT
    ASCII P RS232.OUT
    ASCII L RS232.OUT
    ASCII A RS232.OUT
    ASCII Y RS232.OUT
    32 RS232.OUT
    ASCII S RS232.OUT
    ASCII T RS232.OUT
    ASCII A RS232.OUT
    ASCII T RS232.OUT
    ASCII ; RS232.OUT
;
: LCD1
    ASCII L RS232.OUT
    ASCII C RS232.OUT
    ASCII D RS232.OUT
    32 RS232.OUT
    ASCII 1 RS232.OUT
    ASCII ; RS232.OUT
;


VUPORT {BIG}                            \ Entire screen
    .3 0 VUPORT.ORIG
    .7 1 VUPORT.SIZE

VUPORT {MIDDLE}                         \ Section for printed results
    .3125 .15 VUPORT.ORIG
    .425 .75 VUPORT.SIZE

VUPORT {BOX1}                           \ Area for Bargraph labels
            .05 0 VUPORT.ORIG
    .2 1 VUPORT.SIZE
```

```
VUPORT {BOX2}                                      \ Bargraph areas
    .1 0 VUPORT.ORIG
    .1 1 VUPORT.SIZE

: ERROR?

    CALL[ PCI46S , ERR.SYS , ERROR.CODE ]
    ERROR.CODE 0 <> IF
        "TYPE ERROR.CODE . CR
    ELSE
        "DROP
    THEN
;

: CONFIG.PORTS
                                                   \ IO Interupt vector
    61H SET.VECT
    CALL[ PCI46S , SYSINIT ]

    -12288 SEGMT :=                                \ Base address
    CALL[ PCI46S , INIT , SEGMT ]

    0 CHN :=                                       \ Port 0
    CALL[ PCI46S , CNF.DI , CHN ]
    " Error in configure channel 0 " ERROR?

    8 CHN :=
    CALL[ PCI46S , CNF.DI , CHN ]                  \ port 1
    " Error in configure channel 8 " ERROR?

    16 CHN :=                                      \ port 2
    CALL[ PCI46S , CNF.DI , CHN ]
    " Error in configure channel 16 " ERROR?

    1 INITV :=
    24 CHN :=                                      \ port 3
    CALL[ PCI46S , CNF.DO , CHN , INITV ]
    " Error in configure channel 24 "  ERROR?
;

: NUMINPUT

    BEGIN
        #INPUT NOT
    WHILE
        CR  ." Invalid number try again "
    REPEAT
;
    : DIS.RESULTS
          {BIG}                                          \ turn color to black
        0 COLOR
        .77 .5 POSITION
        LABEL                                      \ write over last value
        7 COLOR                                    \ turn color to green
        MASS "." LABEL                             \ write new value
        .37 .1 POSITION
        0 COLOR

        LABEL                                      \ erase old time
        7 COLOR
        WTIME "." LABEL                            \ write new
        WTIME "."                                  \ stor  values for
        MASS "."                                   \ erasing next time
        CURSOR.OFF
        {BOX2}                                     \ set up bargraph
        NORMAL.COORDS
        VUPORT.ARRAY RESTORE.VUPORT                \ erase old bar
        7 VUPORT.COLOR
        MASS 5. /
        .10 SWAP                                   \ calculate size of new bar
```

```
        VUPORT.SIZE
        VUPORT.CLEAR                             \ new bar
        0 VUPORT.COLOR
    ;
    : CALC.PERIODS2
        1 SCALE :=
        0 TIMES :=
        NO.CROSS 1 - 1 DO
            I 2 + Y1 :=
            CROSS [ Y1 ] CROSS [ I ] -          \ calculate individual periods
            TIMES [ I ] :=

        LOOP
        TIMES SCALE * TIMES :=                   \ and scale
    ;
    : CALC.POSTAGE
        TIMES SUB[ 3 , NO.CROSS 4 - , 1 ]        \ pick the significant values
        SORT
        NO.CROSS 4 - 4 / LOW.CROSS :=
        NO.CROSS 4 - 2 / CROSS.RANGE :=
        SUB[ LOW.CROSS , CROSS.RANGE , 1 ]       \ take the middle
        MEAN ZTIME :=                            \ and average

\        NO.RANGES 1 DO
\            ZTIME PVALUE [ I , 1 ]  >=         \ calculate postage due
\            ZTIME PVALUE [ I 1 + , 1 ] <=
\            AND
\            IF LEAVE THEN
\        LOOP

\        PVALUE [ I 1 + , 2 ] POSTAGE :=
    ;
: CALC.PERIOD

        CROSS [ NO.CROSS ] CROSS [ LOW.CROSS ] - 2. *
        NO.CROSS LOW.CROSS - /
        ZTIME :=
    ;

    :   MENU
        NORMAL.DISPLAY
        SCREEN.CLEAR
        28 1 GOTO.XY
        ." P I T N E Y   B O W E S "
        17 3 GOTO.XY
        ." V I B R A T I N G   T R A Y   S C A L E "
        10 6 GOTO.XY
        ." 1)    No. of Zero Crossings :"
        60 6 GOTO.XY NO.CROSS .
        10 8 GOTO.XY
        ." 2)    Zero Crossing to Start Averaging : "
        60
        8 GOTO.XY LOW.CROSS .
        10 10 GOTO.XY
        ." 3)    Envelope Position Delay : "
        60 10 GOTO.XY ENVEL.DELAY .

        10 12 GOTO.XY
        ." 4)    Time to Wait for Envelope to Stop : "
        60 12 GOTO.XY STOP.DELAY .
        10 14 GOTO.XY
        ." 5)    Time to Wait for Wheels to Pulldown : "
        60 14 GOTO.XY PULLDOWN.DELAY .

        10 16 GOTO.XY
        ." 6)    Delay to Wait for Envelope Ejection : "
        60 16 GOTO.XY EJECT.DELAY .

        10 18 GOTO.XY
        ." 7)    Reset Max , Min and Delta Values : "
```

```
10 20 GOTO.XY
." 8)    EXIT MENU : "
5 22 GOTO.XY
." ENTER CHOICE > "
5 24 GOTO.XY
." MAX "
30 24 GOTO.XY
." MIN "
55 24 GOTO.XY
." DELTA "
10 24 GOTO.XY MAXTIME .
35 24 GOTO.XY MINTIME .
62 24 GOTO.XY MAXTIME MINTIME - .

BEGIN
    20 22 GOTO.XY NUMINPUT
    dup
    CASE

            1 OF  60 6  GOTO.XY
                  NUMINPUT  NO.CROSS :=
                  60 6 GOTO.XY ."          "
                  60 6 GOTO.XY NO.CROSS .
                  ENDOF

            2 OF  60 8 GOTO.XY
                  NUMINPUT LOW.CROSS :=
                  60 8 GOTO.XY ."          "
                  60 8 GOTO.XY LOW.CROSS .
                  ENDOF

            3 OF 60 10 GOTO.XY
                  NUMINPUT ENVEL.DELAY :=
                  60 10 GOTO.XY ."          "
                  60 10 GOTO.XY ENVEL.DELAY .
                  ENDOF
            4 OF  60 12 GOTO.XY
                  NUMINPUT  STOP.DELAY :=
                  60 12 GOTO.XY ."          "
                  60 12 GOTO.XY STOP.DELAY .
                  ENDOF
            5 OF  60 14 GOTO.XY
                  NUMINPUT  PULLDOWN.DELAY :=
                  60 14 GOTO.XY ."          "
                  60 14 GOTO.XY PULLDOWN.DELAY .
                  ENDOF
            6 OF  60 16 GOTO.XY
                  NUMINPUT  EJECT.DELAY :=
                  60 16 GOTO.XY ."          "
                  60 16  GOTO.XY EJECT.DELAY .
                  ENDOF
            7 OF  100000 MINTIME :=
                  0 MAXTIME :=
                  10 24 GOTO.XY ."          "
                  35 24 GOTO.XY ."          "
                  62 24 GOTO.XY ."          "
                  ENDOF
            8 OF ."    Running Envelopes "
                  ENDOF
  ENDCASE
  8 =
  UNTIL
;
: MAIN.DISPLAY
   SCREEN.CLEAR
   GRAPHICS.DISPLAY
   {BIG}
   0 VUPORT.COLOR
   VUPORT.CLEAR
   OUTLINE
  .215 .8 POSITION
```

```
  " P I T N E Y   B O W E S "
  LABEL
  .1  .65 POSITION
  " V i b r a t i n g   T r a y   S c a l e " LABEL
  .1 .35 POSITION
  " P O S T A G E   D U E : " LABEL
  .1 .5 POSITION
  " E N V E L O P E   W E I G H T : "  LABEL
  .1 .1 POSITION

  " Stop Time :" LABEL
  CURSOR.OFF

  {BOX1}
  0 VUPORT.COLOR
       VUPORT.CLEAR
  .1 .2 POSITION " 1 " LABEL
  .1 .4 POSITION " 2 " LABEL
  .1 .6 POSITION " 3 " LABEL
  .1 .8 POSITION " 4 " LABEL
  {BOX1}
   {BOX2}
  .1 0 VUPORT.ORIG
  .1 1 VUPORT.SIZE
  OUTLINE
  0 .2 POSITION 1 .2 DRAW.TO
  0 .4 POSITION 1 .4 DRAW.TO
  0 .6 POSITION 1 .6 DRAW.TO
  0 .8 POSITION 1 .8 DRAW.TO
  VUPORT.ARRAY STORE.VUPORT

  ;
: WHEELS.DOWN
     29 CHN :=
     1 OUTVAL :=
     CALL[ PCI46S , WRITE.CH , DOBT.T , CHN , OUTVAL ]
;
: WHEELS.UP
     29 CHN :=
     0 OUTVAL :=
     CALL[ PCI46S , WRITE.CH , DOBT.T , CHN , OUTVAL ]
;
: KICK
     27 CHN :=
     0 OUTVAL :=
     CALL[ PCI46S , WRITE.CH , DOBT.T , CHN , OUTVAL ]
     1 OUTVAL :=
     CALL[ PCI46S , WRITE.CH , DOBT.T , CHN , OUTVAL ]
;
: ?envelope
    25 CHN :=                          \ Enable envelope sensing
    1 OUTVAL :=
    CALL[ PCI46S , WRITE.CH , DOBT.T , CHN , OUTVAL ]

    BEGIN
       21 CHN :=                       \ Check for high value from sensor
       CALL[ PCI46S , READ.CH , DIBT.T , CHN , INVAL ]
       INVAL 1 =
    UNTIL                              \ Return
;

: WEIGH

    WHEELS.DOWN

    REL.TIME                           \ Record Start time

    PULLDOWN.DELAY                     \ Wait for wheels to drop
    MSEC.DELAY

    KICK
```

```
8 MSEC.DELAY                                   \ Clear and Kick
26 CHN :=
0 OUTVAL :=
CALL[ PCI46S , WRITE.CH , DOBT.T , CHN , OUTVAL ]
1 OUTVAL :=
CALL[ PCI46S , WRITE.CH , DOBT.T , CHN , OUTVAL ]
1 NO.CROSS + 1 DO

      BEGIN

          22 CHN :=                   \ look for crossing ready
          CALL[ PCI46S , READ.CH , DIBT.T , CHN , INVAL ]
          INVAL 1 =
      UNTIL
      0 OUTVAL :=
      26 CHN :=                       \ Clear to signify crossing read
      CALL[ PCI46S , WRITE.CH , DOBT.T , CHN , OUTVAL ]

      0 CHN :=                        \ Low byte
      CALL[ PCI46S , READ.CH , DI.T , CHN , LBYTE ]

      8 CHN :=                        \ mid byte
      CALL[ PCI46S , READ.CH , DI.T , CHN , MBYTE ]

      16 CHN :=                       \ high nibble
       CALL[ PCI46S , READ.CH , DI.T , CHN , HBYTE ]

      HBYTE #>MASK                    \ Take only first 4 bits
      15 #>MASK
      AND
      MASK>#  HBYTE :=

      LBYTE MBYTE 256 * HBYTE 65536 * + +     \ combine into 1 number
      CROSS [ I ] :=


      1 OUTVAL :=
      26 CHN :=                                \ Enable next measurement
      CALL[ PCI46S  , WRITE.CH , DOBT.T , CHN , OUTVAL ]


    LOOP

REL.TIME                                        \ Stop time
    WHEELS.UP
  ;
: CALIBRATE
                                                \ Set up
    24 CHN :=
    207 OUTVAL :=
    CALL[ PCI46S , WRITE.CH , DO.T , CHN , OUTVAL ]

    SCREEN.CLEAR
    5 5 GOTO.XY
    ." Make sure scale is clear ( Hit any key when ready ) "
    KEY
    DROP
    0 ZTIME.TOTAL :=
    WEIGH DROP DROP                             \ Exercise
    EJECT.DELAY
    MSEC.DELAY
    WEIGH DROP DROP
    EJECT.DELAY
    MSEC.DELAY
    WEIGH DROP DROP
    EJECT.DELAY
    MSEC.DELAY
    31 1 DO                                     \ take 10 readings
      WEIGH
      DROP DROP
```

```
    EJECT.DELAY
    MSEC.DELAY
    CALC.PERIOD
    ZTIME.TOTAL ZTIME + ZTIME.TOTAL :=         \ Add together for average
LOOP
ZTIME.TOTAL 30 / DUP * T0 :=                   \ take mean
5 5 GOTO.XY
." Place weight 1 on the scale hit any key when ready "
KEY
DROP
5 7 GOTO.XY
." Enter the weight " NUMINPUT M1 :=
0 ZTIME.TOTAL :=
31 1 DO                                        \ Mass number 1
    WEIGH
    DROP DROP
    CALC.PERIOD
    ZTIME.TOTAL ZTIME + ZTIME.TOTAL :=
    EJECT.DELAY
    MSEC.DELAY
LOOP
ZTIME.TOTAL 30 / DUP * T1 :=
5 5 GOTO.XY
." Place weight 2 on the scale hit any key when ready "
KEY
DROP
5 7 GOTO.XY
."                                        "
5 7 GOTO.XY
." Enter the weight " NUMINPUT M2 :=
0 ZTIME.TOTAL :=
31 1 DO
    WEIGH                                      \ mass number 2
    DROP DROP
    EJECT.DELAY
    MSEC.DELAY
    CALC.PERIOD
    ZTIME.TOTAL ZTIME + ZTIME.TOTAL :=
LOOP
ZTIME.TOTAL 30 / DUP * T2 :=
M1 T1 T0 - /   M2 T2 T0 - / - T1 T2 - / C2 :=  \ Calculate C2
M1 T1 T0 - / C2 T1 T0 - * - C1 :=              \ plub in and solve
;                                              \ for C1
: CALC.WEIGHT
C1 ZTIME DUP * T0 - *  C2 ZTIME DUP * T0 - DUP * * +
MASS :=
;
: RUN.ENVL

207 OUTVAL :=                                  \ Set up ports
24 CHN :=
CALL[ PCI46S , WRITE.CH , DO.T , CHN , OUTVAL ]

MAIN.DISPLAY
"          "
"          "                                   \ fancy display

STARTMOT                                       \ Exercise
1000 MSEC.DELAY
STOPMOT
WEIGH
STARTMOT
1000 MSEC.DELAY
STOPMOT
WEIGH
STARTMOT
1000 MSEC.DELAY
STOPMOT

25 chn :=                                      \ Clear envelope sensor
0 OUTVAL :=
```

```
    CALL[ PCI46S , WRITE.CH , DOBT.T , CHN , OUTVAL ]
    25 CHN :=

    1 OUTVAL :=                                    \ Enable Sensor
    CALL[ PCI46S , WRITE.CH , DOBT.T , CHN , OUTVAL ]
\ Look for envelopes

  DISPSTAT

  BEGIN
  STARTMOT

    ?ENVELOPE

    ENVEL.DELAY                                 \ Wait till envelope is in
    MSEC.DELAY                                  \ correct position

    STOPMOT                                     \ then stop

    25 CHN :=                                   \ Clear sensor
    0 OUTVAL :=
    CALL[ PCI46S , WRITE.CH , DOBT.T , CHN , OUTVAL ]

    STOP.DELAY                                  \ Wait for envelope to stop
    MSEC.DELAY

    SHUTDOWN                                    \ turn off motor

    WEIGH                                       \ and weigh envelope

    STARTMOT                                    \ start up again

    SWAP                                        \ compute stop time
    - WTIME :=
    1 MSEC.DELAY

    0 OUTVAL :=

    CALC.PERIOD                                 \ calculate average period
    CALC.WEIGHT                                 \ calculate weight

    DIS.RESULTS                                 \ and display the results

    EJECT.DELAY                                 \ Weight for envelope to
    MSEC.DELAY                                  \ clear out

    25 CHN :=                                   \ Enable envelope sensing
    1 OUTVAL :=
    CALL[ PCI46S , WRITE.CH , DOBT.T , CHN , OUTVAL ]
    ZTIME MAXTIME > IF ZTIME MAXTIME := THEN
    ZTIME MINTIME < IF ZTIME MINTIME := THEN

    ?KEY                                        \ Check to see if operator
  until                                         \ wants out
  STOPMOT

  ;
  : DEMO
   \ SET UP DEFAULT VALUES
   INSTALL NOP IN TURNKEY
   10 NO.CROSS :=
   4 LOW.CROSS :=
   17 ENVEL.DELAY :=
   50 STOP.DELAY :=
   75 PULLDOWN.DELAY :=
   500 EJECT.DELAY :=
   100000 MINTIME :=
   0 MAXTIME :=
   2.86069219E-8 C1 :=
   -.70375326E-18 C2 :=
```

```
6.87084089E8 TO :=
config.ports
RS232.PORT
-1 2 FIX.FORMAT
begin
   SHUTDOWN
   NORMAL.DISPLAY
   SCREEN.CLEAR
   27 3 GOTO.XY ." P I T N E Y   B O W E S "
   22 5 GOTO.XY ." V I B R A T I N G   T R A Y   S C A L E "
   15 10 GOTO.XY ." 1)     Calibrate System "
   15 12 GOTO.XY ." 2)     Change System Parameters "
   15 14 goto.xy ." 3)     Run Envelopes "
   15 16 goto.xy ." 4)     Exit program "
   10 18 goto.xy ." Enter Choice > "
   NUMINPUT
   DUP
   CASE
      1 OF CALIBRATE ENDOF
      2 OF MENU ENDOF
      3 OF RUN.ENVL ENDOF
      4 OF ." Returning to ASYST " ENDOF
   ENDCASE
   4 =
   UNTIL
  ;
```

What is claimed is:

1. A scale comprising:

a horizontally extending article supporting means, means for securely holding an article on said article supporting means to provide unity of movement, means for initiating oscillation of said article supporting means, means for measuring the frequency of oscillation of said article supporting means, and means for correlating the mass of an article on said article supporting means with the measured frequency of oscillation.

2. The scale of claim 1 wherein said means for causing oscillation includes an electromagnet secured to a frame and an armature secured to said article supporting means, said armature being in close proximity to said electromagnet.

3. The scale of claim 2 including means for conveying an article across said article supporting means.

4. The scale of claim 3 including means for sensing the presence of an article on the said article supporting means.

5. The scale of claim 4 including means for controlling the activities of said conveying means in response to said measuring means and said sensing means.

6. A mass measuring device comprising:

a base, a horizontally extending article receiving platform, at least one flexible member providing connection between said base and said article receiving platform, a transducer connected to said flexible member, means for initiating free oscillation of said article receiving platform, means connected to said transducer for measuring the frequency of oscillation of said platform, and means for determining the mass of an article located upon said platform in response to said frequency measuring means.

7. The mass measurement device of claim 6 wherein said means for oscillating said platform includes means for oscillating said platform in the plane of said platform.

8. The mass measuring device of claim 7 wherein said means for oscillating said platform includes an electromagnet secured to said base and an armature secured to said platform in close approximation to said electromagnet.

9. The mass measuring device of claim 8 including means for conveying an article located upon said platform.

10. The mass measuring device of claim 9 including means for sensing the presence of an article on the said

11. The mass measuring device of claim 10 wherein said conveying means includes means for removing an article located upon said platform.

12. The mass measuring device of claim 11 wherein said means for controlling the activities of said conveying means in response to said frequency determining means and said sensing means.

13. The mass measuring device of claim 12 including means for securely holding said platform in response to said sensing means sensing no article on said platform.

14. The mass measuring device of claim 13 wherein said transducer is a piezoelectric device.

15. A mass measuring device, comprising:

a frame, a base supported by said frame, an article receiving platform, at least one flexible member providing connection between said base and said article receiving platform, a transducer connected to said flexible member, means for oscillating said article receiving platform, means connected to said transducer for measuring the frequency of oscillation of said platform, and means for determining the mass of an article located upon said platform in response to the measured frequency of oscillation.

16. The mass measuring device of claim 15 wherein said platform has openings therein and including a plurality of rollers and means supported by said frame for moving rollers into and out of said openings.

17. The mass measuring device of claim 15 including means for measuring the frequency of the voltage generated in said transducer as a result of the oscillation of said platform.

18. The mass measuring device of claim 17 wherein said means for causing oscillation includes a electromagnet secured to said frame and an armature secured to said platform in close proximity to said electromagnet.

19. The mass measuring device of claim 18 wherein said platform has a plurality of openings therein and including means for conveying an article located upon said platform, said conveying means including first rollers supported by said frame and receivable within said platform openings, means for driving at least one of said first rollers and a plurality of second rollers, each of said second rollers being in registration with one of said first rollers, said platform being substantially intermediate said first and second rollers.

20. The mass measuring device of claim 19 wherein said second rollers have a width greater than the width of said openings in said platform.

21. The mass measuring device of claim 20 including means for urging said second rollers into contact with said platform to securely hold an article located on said platform to said platform.

22. The mass measuring device of claim 19 including means for sensing the presence of an article on the said platform.

23. The mass measuring device of claim 22 including means for controlling the activities of said conveying means in response to said frequency measuring means and said sensing means.

24. The mass measuring device of claim 23 including means for moving said first rollers into and out of said platform openings.

25. The mass measuring device of claim 15 wherein said means for said frame supporting said base includes resilient isolators.

26. The mass measuring device of claim 25 wherein said resilient isolators are springs.

27. A mass measuring device, comprising:

a frame, a base resiliently supported by said frame, a generally horizontally extending article receiving platform having openings therein, a plurality of flexible members providing connection between said base and said article receiving platform, a transducer connected to one of said flexible members, means for sensing the presence of an article located upon said platform, means for causing said article receiving platform to oscillate, a plurality of first rollers movably supported by said frame for movement into and out of said platform openings, means for moving said first rollers into and out of said platform openings, and means for rotating said first rollers.

28. The mass measuring device of claim 27 including means for measuring the frequency of the voltage generated in said transducer as a result of the oscillation of said platform.

29. The mass measuring device of claim wherein said means for causing oscillation includes an electromagnet secured to said frame and an armature secured to said platform in close proximity to said electromagnet.

30. The mass measuring device of claim 29 including a plurality of second rollers supported by said platform, each of said second rollers being in registration with one of said first rollers, said platform being generally located intermediate said first and second rollers.

31. The mass measuring device of claim 30 wherein said second rollers have a width greater than the width of said openings in said platform and including means for urging said second rollers into contact with said platform.

32. The mass measuring device of claim 31 including means for controlling the rotation of said first rollers in response to said sensing means and for controlling said roller moving means in response to said frequency measuring means.

33. In a weighing device, the combination comprising:

a frame, a base yieldably supported by said frame, a generally horizontally extending article receiving platform, at least one yieldable member providing connection between said base and said article receiving platform, first locking means for locking said platform to said base, second locking means for locking said frame to said base, means for unlocking said first and second locking means and, means for initiating oscillation of said platform.

34. The weighing device of claim 33 wherein said first locking means includes rubber buttons supported by said base and engageable by said platform and said second locking means includes at least one pad supported by said base and at least one solenoid supported by said frame and engageable with said pad.

35. A method or determining the mass of an article, the steps comprising:

supporting a platform with flexible members, placing a transducer on one of the flexible members, oscillating the platform,
measuring the output of the transducer,
placing an article upon the platform,
oscillating the platform,
measuring the output of the transducer with the article on the platform,
comparing the output of the transducer without an article on the platform against the output of the transducer with the article on the platform,
and determining the mass of the article based upon said comparison.

36. The method of claim 35 including placing a piezoelectric transducer on one of the flexible members,
passing the voltage output by the transducer during oscillations of the platform through a zero crossing detector,
measuring the frequency of zero crossings,
comparing the frequency of the zero crossings without an article on the platform against the frequency of the zero crossings with an article on the platform, and
determining the mass of the article based upon the comparison of the frequencies with and without an article on the platform.

37. The method of claim 35 wherein the steps of determining the mass of the article is in accordance with the formula:

$$M_E = C_1(T^2 - T_0^2) + C_2(T^2 - T_0^2)^2,$$

wherein $M_E$ is the article mass, $T_0$ is the period of oscillation with no article, T is the period with the article present, $C_1$ and $C_2$ are constants which depend on the mass of the base, the mass of the platform, the spring constants of the isolation springs and the spring constant of the flexure springs.

38. A method of determining the mass of an article, the steps comprising:
placing an article upon a platform,
securely holding the article on the platform,
initiating free oscillation of the platform,
measuring the frequency of the oscillation of the platform, and
determining the mass of the article based upon the frequency of oscillation.

39. The method of claim 38 wherein the steps of determining the mass of the article is in accordance with the formula:

$$M_E = C_1(T^2 - T_0^2) + C_2(T^2 - T_0^2)^2,$$

where $M_E$ is the article mass, $T_0$ is the period of oscillation with no article, T is the period with the article present, $C_1$ and $C_2$ are constants that are derived empirically, from calibration procedures.

40. A method of determining the mass of an article, the steps comprising:
placing an article upon a platform,
initiating free oscillation of the platform,
generating a signal corresponding to the oscillation of the platform,
filtering the generated signal to eliminate the effects of external vibration,
measuring the frequency of the filtered signal, and
determining the mass of the article based upon the frequency of the filtered signal.

41. In a weighing scale, the combination comprising:
a frame,
a base resiliently supported by said frame,
a horizontally extending platform,
at least one member providing connection between said base and said platform,
a cage vertically movable located below said platform,
means for moving said cage into first and second locations, said cage being in engagement with said platform when in said first location and out of engagement with said platform when in said second location.

42. The weighing scale of claim 41 wherein said means for moving said cage is a solenoid supported by said frame and in engagement with said cage.

43. The weighing-scale of claim 42 wherein said platform has openings therein and said cage rotatably supports rollers that are receivable within said openings when said cage is in said second location.

44. The weighing scale of claim 43 wherein said cage has resilient buttons that engage said platform when said cage is in said first location.

45. A scale comprising:
a horizontally extending article supporting means,
means for securely holding an article on said article supporting means to provide unity of movement,
means for initiating oscillation of said article supporting means at an acceleration greater than the acceleration due to gravity,
means for measuring the frequency of oscillation of said article supporting means, and
means for correlating the mass of an article on said article supporting means with the measured frequency of oscillation.

46. The scale of claim 45 wherein said means for causing oscillation includes an electromagnet secured to a frame and an armature secured to said article supporting means, said armature being inclosed proximity to said electromagnet.

47. The scale of claim 46 including means for conveying an article across said article supporting means.

48. The scale of claim 47 including means for sensing the presence of an article on the said article supporting means.

49. The scale of claim 48 including means for controlling the activities of said conveying means in response to said measuring means and said sensing means.

* * * * *

UNITED STATES PATENT AND TRADEMARK OFFICE
CERTIFICATE OF CORRECTION

PATENT NO. : 4,778,018

DATED : October 18, 1988

INVENTOR(S) : Robert A. Cordery et al.

It is certified that error appears in the above-identified patent and that said Letters Patent is hereby corrected as shown below:

Column 30, line 65: after "said" insert --platform.--;

Column 32, line 25: after "claim" insert --28--;
Column 32, line 65: change "or" to --of--;

Column 34, line 48: change "inclosed" to --in close--.

Signed and Sealed this

Thirteenth Day of April, 1993

*Attest:*

STEPHEN G. KUNIN

*Attesting Officer*

*Acting Commissioner of Patents and Trademarks*